United States Patent [19]
Brown et al.

[11] Patent Number: 5,113,413
[45] Date of Patent: May 12, 1992

[54] VOTER ARRANGEMENT FOR MULTIPLE SITE PST RF TRUNKING SYSTEM

[75] Inventors: Thomas A. Brown; Charles L. Derenge; Houston H. Hughes, III, all of Lynchburg; Craig Szczutkowski, Forest; Vicki J. Teel, Goode; Marcella M. Tucker, Amherst, all of Va.

[73] Assignee: Ericsson GE Mobile Communications Inc., Lynchburg, Va.

[21] Appl. No.: 501,940

[22] Filed: Mar. 30, 1990

Related U.S. Application Data
[63] Continuation-in-part of Ser. No. 363,980, Jun. 9, 1989.

[51] Int. Cl.⁵ .......................... H04B 7/10; H04L 1/02
[52] U.S. Cl. ...................... 375/40; 375/100; 455/133
[58] Field of Search .............. 375/40, 3, 4, 100; 455/57, 10, 13, 133, 62, 134, 135, 136

[56] References Cited

U.S. PATENT DOCUMENTS

| | | | |
|---|---|---|---|
| 4,701,109 | 10/1972 | Peters | 417/223 |
| 4,013,962 | 3/1977 | Beseke | 455/10 |
| 4,128,809 | 12/1978 | Kage | 375/100 |
| 4,232,294 | 11/1980 | Burke et al. | 340/825.5 |
| 4,317,218 | 2/1982 | Perry | 455/54 |
| 4,317,220 | 2/1982 | Martin | 455/58 |
| 4,395,710 | 7/1983 | Einolf, Jr. et al. | 340/825.5 |
| 4,475,246 | 10/1984 | Batlivala et al. | 455/18 |
| 4,516,269 | 7/1985 | Krinock | 379/60 |
| 4,530,087 | 7/1988 | Yamamoto | 375/100 X |
| 4,570,265 | 2/1986 | Thro | 455/52 |
| 4,583,089 | 4/1986 | Cope | 340/825.05 |
| 4,593,282 | 6/1986 | Acampora et al. | 340/825.5 |
| 4,623,886 | 11/1986 | Livingston | 340/825.5 |
| 4,628,311 | 12/1986 | Milling | 340/825.5 |
| 4,638,311 | 1/1987 | Gerety | 340/825.06 |
| 4,642,630 | 2/1987 | Beckner et al. | 340/825.5 |
| 4,644,348 | 2/1987 | Gerety | 340/825.06 |
| 4,652,873 | 3/1987 | Dolsen et al. | 340/825.5 |
| 4,677,612 | 6/1987 | Olson et al. | 370/85.2 |
| 4,682,324 | 7/1987 | Ulug | 370/85.3 |
| 4,696,051 | 9/1987 | Breeden | 455/33 |
| 4,696,052 | 9/1987 | Breeden | 455/51 |
| 4,707,693 | 11/1987 | Hessel | 340/825.51 |
| 4,835,731 | 5/1989 | Nazarenko et al. | 379/63 |
| 4,868,851 | 9/1989 | Trinidad et al. | 375/40 |
| 4,905,302 | 2/1990 | Childress | 455/34 |
| 4,972,507 | 11/1990 | Lusignan | 455/57 |

FOREIGN PATENT DOCUMENTS
61-107826  5/1986  Japan .

Primary Examiner—Benedict V. Safourek
Assistant Examiner—Tesfaldet Bocure
Attorney, Agent, or Firm—Nixon & Vanderhye

[57] ABSTRACT

A digital voter system for a multiple site digitally trunked RF communications system includes an improved voting arrangement which tests for actual redundancy before removing redundant messages—thereby decreasing retransmission traffic in simulcast and other large coverage area RF trunking systems. Status messages indicating ongoing call reception are generated periodically by each receiver site which receives a given call. The status messages are received by a digital voter, which in a clear voice mode is used to determine (in responses to the status messages) whether an analog voter should maintain a clear voice call.

12 Claims, 5 Drawing Sheets

VOTER ARRANGEMENT FOR MULTIPLE SITE PST RF TRUNKING SYSTEM

CROSS-REFERENCES TO RELATED PATENT APPLICATIONS

This application is a continuation-in-part of copending U.S. patent application of Brown et al Ser. No. 07/363,980 filed 9 Jun. 1989.

This application is related to copending U.S. patent application of Derenge et al Ser. No. 07/420,244 filed 12 Oct. 1989; and to copending application Ser. No. 07/260,184 of Rose et al filed 20 Oct. 1988.

FIELD OF THE INVENTION

The present invention relates to digital trunked radio communications systems including multiple RF receivers. Still more particularly, the invention relates to receiving incoming messages from different radio receiver sites, for determining whether the messages are redundant, and for "voting" on (and thereby selecting between) several redundant messages.

BACKGROUND AND SUMMARY OF THE INVENTION

Modern trunked radio communications systems typically include geographically distributed (so-called "satellite") receiving sites in addition to one or more main transmitting site. In a simple system including only one main transmitting/repeater site, the main transmitting-/repeater site is typically located at a relatively high elevation and generally is provided with relatively high powered RF transmitters to permit the site to "cover" a large geographical service area. The main site transmitter output power and other factors contributing to "effective radiated power" (ERP) are selected so that signals transmitted by the main site can be received at minimal acceptable signal strength throughout the entire service area.

However, most or all of the mobile and portable RF transceivers served by the main site do not have the same high effective radiated power as is provided by the main site.

While the main site transmitter power output can be in the range of several hundreds or thousands of watts of RF power, a mobile transceiver may be capable of providing only on the order of 5 watts RF at its output and portable (e.g., hand held) transceivers may be capable of generating even less power (e.g., 1 watt or even less). Size and cost limitations dictate the limited RF power outputs of mobile and portable units, and power source limitations are also a critical factor. A portable transceiver using a few small battery cells as its power source can provide only a low RF power output level. Mobile transceivers can obtain additional power from a vehicle electrical system, but even this power source imposes serious constraints on the maximum power supply current available to the transceiver.

The various mobile and portable transceivers within a radio communications system typically have high receiver sensitivities but typically also have much lower effective radiated power outputs than do the transmitters at the main site. All mobile/portable transceivers within the service area can therefore typically receive the strong transmissions from the main site but the receivers located at the main site may not be able to receive the weaker transmissions from the mobile and portable transceivers (or may receive the transmissions at signal strengths which are too low to provide useful, reliable communications). In other words, the "talk in" range of the overall system is typically less than its "talk out" range. This problem remains when multiple transmitting sites are used to further increase "talk out" range.

Multiple receiving sites have been employed in the past to alleviate this problem. Typically, so-called "satellite" receiving sites are provided at various geographical locations distributed throughout the service area. The transmitting site is typically provided with receivers, and further receivers are provided at each of several geographically-disparate satellite receiving sites. When a mobile or portable receiver located within the service area transmits, at least one (and perhaps more) of the satellite receiving sites and the transmitting site may receive the transmission. Depending upon where in the service area the transmitting mobile/portable is located when it transmits, some receiving sites receive the transmission at high signal strength levels, other sites will receive the transmission at lower levels, and some sites may not receive the transmission at all. This is especially true in systems such as "simulcast" multiple transmitting site type systems having extremely large service areas.

The overall communication system needs to acceptably receive only a single version of each mobile/portable transmission. However, it is likely that more than one receiving site will receive a version of the transmission. It is desirable therefore to select only one version of the received message and to ignore redundant received versions of the same message (this process is called "redundancy removal").

Since the various receiving sites typically receive a given mobile/portable transmission at different average signal strengths, it may, for example, be desirable in some systems to select the version of the transmission received with the "best" quality (e.g., highest average signal strength or lowest bit error rate)—since that version is most likely to have carried the communicated information reliably and correctly (noise, fading and other phenomena can all act to degrade reception of weak signals). In many prior art systems, all sites which receive the transmission generate an "RSSI" (or similar) indication of the quality of the received signal (e.g., based on received signal strength and/or other factors). The overall communication system then typically may "vote" on redundant versions of the same received signal (based on the quality indications reported by the different receiving sites, for example) to select a single version of the received signal for use. Commonly assigned U.S. Pat. No. 4,317,218 to Perry (1982) describes in detail one example of this type of prior art voting circuit within a repeater station control system. See also, for example, U.S. Pat. No. 4,013,962 to Beseke et al (1977).

Things happen very rapidly in state-of-the-art digital trunking systems such as the General Electric Company 16-PLUS Public Service Trunking (PST) digitally trunked radio communications system. The general architecture and operation of this system is disclosed in more detail, for example, in U.S. patent application Ser. No. 07/056,922 Childress et al filed 3 Jun. 1987, now allowed. In the GE PST system all "inbound" control messages are transmitted beginning at the edge of a 30 ms "slot edge" (defined by synchronization signals on the outbound control and working channels, with the sync signals on each working channel being synchronized with the control channel sync signals). If two mobile/portable transceivers attempt to transmit at or nearly at the same time, their transmissions will either fall within different inbound slots (and thus be separated by 30 ms)—or they will fall within the same slot (and thus be virtually simultaneous). A contention between RF signals on the inbound control channel may result in destroying both transmissions (assuming the system coverage area is small enough) —causing both contending transmitters to "retry" (e.g., using random retry wait periods).

If the system coverage area is larger, on the other hand, two simultaneous low power RF transmission on the same RF channel may not interfere with one another at all, and may instead be received simultaneously by different geographically separated receiving sites without any "RF" collision occurring. To provide acceptable service to large coverage areas, the system should be able to effectively handle such situations. Thus, messages received simultaneously are likely (but not guaranteed) to be redundant versions of the same message of which only one version needs to be selected. The non-selected versions of such redundant messages should be discarded to allow the receivers to handle messages in the next incoming slot. Non-redundant messages, on the other hand, should also be selected. A significant problem arises when a single system component (e.g., the digital voter) must efficiently process different simultaneously received messages.

It would be highly desirable to provide a digital voter for a high data rate digitally trunked radio communication system that eliminates data collisions on the voter bus, removes most or all redundant messages while selecting only one version of each different message (even when different messages are not simultaneously received by the system), does not significantly impact system latency, and also efficiently terminates handling of calls.

The above-referenced prior U.S. application of Brown et al (Ser. No. 07/363,980) discloses a digital voter arrangement which uses a "windowing" technique to arbitrate bus contention on an asynchronous common communication voter link. This digital voter arrangement reduces communication latency by entirely eliminating centralized bus assignment (and eliminates the corresponding message overhead required by the controller), yet still prevents message collisions on the common voter link. The digital voter provided by the Brown et al arrangement also efficiently eliminates most redundant messages. The entire disclosure of that earlier filed U.S. application Ser. No. 07/363,980 filed 9 Jun. 1989 is incorporated by reference herein.

Briefly, one aspect of that earlier disclosed Brown et al voter involves assigning a unique "start transmission" time window to each voter digital receiver contending for the voter link. Each digital receiver which has successfully seized a "service request" line times a duration unique to it beginning from the time it seizes the line. During this timed duration, the digital receiver "listens" on the common voter link for the start of transmission of a digital receiver having an "earlier" window assignment. If no start of transmission is detected by the time the digital receiver's unique delay time has elapsed, the digital receiver begins to transmit its message on the link. Digital receivers with "later" window assignments detect this transmission, abort their own attempts to transmit on the link, and discard their messages—thus preventing message collisions on the BSL.

While the earlier disclosed Brown et al digital voter arrangement has been highly successful in its own right, further improvements are possible.

An assumption upon which certain aspects of certain features of the earlier-filed Brown et al disclosure was based was that most messages received simultaneously by the system are redundant messages. This assumption does not always turn out to be correct. In many systems the assumption is nearly always correct because RF collisions may generally prevent most RF messages transmitted simultaneously on the same RF channel from being received by any receiver (and mechanisms can be provided to handle the few situations in which it is incorrect). However, in so-called "simulcast" and other very large coverage area systems this assumption may turn out to be inaccurate.

Simulcast systems, as is well known, include two or more transmitting sites which transmit messages simultaneously so as to cover a greater coverage area. A typical simulcast system includes two or more geographically separated transmitting sites and tens of widely geographically separated "satellite" receiving sites. It is possible in such simulcast systems for geographically separated transceivers to send non-interfering RF messages simultaneously each capable of being properly received—with the probability of this occurring depending upon the size of the user population, the size of the system coverage area, the power of the user transceivers, the terrain, and other complex factors. If the simultaneously transmitting transceivers are separated by enough distance, their transmissions will not interfere with one another and instead each transmission can be received by different respective satellite receiver sites close to the transmitting transceivers. In such circumstances, the overall system is capable of receiving two (or several) different simultaneous RF transmissions. However, if the digital voter to which the received messages are forwarded assumes all simultaneous messages are redundant, it will select only one of the messages and discard the other message(s). This scenario requires transceivers to sometimes retransmit messages that were actually properly received by at least one satellite receiver but were then discarded by the voter—increasing message traffic and introducing delays.

Another problem with prior trunked radio communications system voter designs relates to analog signal voting. The GE PST trunked radio communications system provides several different modes of signal communications, one of which is provides "clear voice" analog frequency modulated transmissions. Such clear voice transmissions are preceded and followed by digital signalling (and in fact have so-called "low speed" or "subaudible" digital signalling superimposed on the analog FM). The earlier disclosed Brown et al voter scheme provided an analog voter to vote on the received analog signals and a digital voter to vote on the received digital signals. Once the digital voter voted on the digital signals preceding a clear voice transmission, the digital voter enabled the analog voter output. The links connecting the voter with one or more receiving sites then was multiplexed over into an analog mode and used to carry analog signals for the duration of the call. When receiving sites detected completion of the call, they would switch the link back to a digital mode (using tone control for example) and send digital call termination signals to the digital voter. While this scheme worked well when calls terminated normally, abnormal call termination (e.g., caused by a portable running out of battery power, deteriorating signalling conditions between the transmitting mobile/portable and the receiving sites, etc.) could sometimes produce anomalous results—resulting in inefficient and untimely analog call termination.

The present invention provides an improved digital voter design which requires message content to be identical before discarding versions of the message as being redundant—while also providing an improved capability for tracking clear voice transmissions without requiring complex and burdensome messaging structure and/or protocol. Improved message content, message handling and communication link protocol result in improved system reliability and performance.

In accordance with one feature of the present invention, the status of a clear voice call is determined collectively by multiple geographically distributed receivers and is very efficiently tracked by the digital voter. A digital communications path is maintained from each of the receiving sites to the voter even while a clear voice call is in progress. The voter echoes, to all digital receivers, each message it receives and selects. This feature further may provide a modified buffer arrangement capable of efficient redundant message checking and also permits all of the digital receivers to be aware of call activity with which other sites may be involved.

During clear voice call handling in the preferred embodiment, receiving sites periodically forward status messages to the voter. The status messages in the preferred embodiment include information from the system site ID message transmitted by the transmitting site, as well as information about the specific receiving site forwarding the message. In the preferred embodiment, transceivers during clear voice transmission transmit low speed (subaudible) data. The presence of this subaudible data stream is tested for by receiving sites as an indication that a clear voice call is in progress. The absence of low speed data is an indication that the call is no longer active at that site—and testing for low speed data is therefore used in the preferred embodiment as the primary means of recovery if the transmitting unit "unkey" (or other call terminate) message is not received (e.g., when the battery of a portable transceiver "runs down" in the middle of a transmission). Low speed data is used (as opposed to just carrier) in the preferred embodiment because it is more reliable and less subject to fades.

The basic rule for keeping a call up in the preferred embodiment is that if any site is receiving valid low speed data, the call should continue. Only if all sites do not "see" low speed data (or if an unkey or drop channel command is received) should the call be terminated. The digital voter examines the low speed status received from the satellite receivers. The digital voter uses this information to decide if the voting should cease. If all satellite receivers have lost low speed data, then all digital receivers will squelch their respective analog voter channel units and the selector will mute the audio. However, as long as there is at least one satellite receiver detecting low speed data (assuming no unkey or drop channel command has been received), the call is kept up, and the selector keeps the audio path unmuted. It is the responsibility of the digital receiver in the preferred embodiment to report the presence of low speed data to the selector.

In the preferred embodiment, since it is not important which site receives and sends this call maintenance messaging to the digital voter, the protocol for transfer from site to site is somewhat analogous to generic players carrying a football. The voice quality voting is done by the analog voter (which in the preferred embodiment may select a different site from the one that is providing digital "status" messages for maintaining the ongoing call). The call starts when a satellite site sends a key message to its digital receiver. Low speed data is flagged as being present at both the satellite site and at the digital receiver and subsequent status messages sent will indicate the presence of low speed data. The status messages provided by the digital receiver are echoed to the other digital receivers—his "teammates"—on a regular, periodic basis. As long as this process continues, the other sites let this site carry the call maintenance/status information. If this site stops seeing low speed data, a status message will immediately be sent, and the message will be echoed to the other digital receivers. By analogy the first site is tossing the football in the general direction of his teammates. Any other sites with status indicating valid low speed data are eligible to pick up the call maintenance. The standard BSL protocol (i.e., as in the prior filed Brown et al application) arbitrates which site carries the call in the preferred embodiment. A fixed time is allowed for this transfer. If the transfer does not take place because no other sites are eligible, the call is "whistled" over by the selector and the analog voter output is inhibited.

A similar transfer occurs in the preferred embodiment in the event that messages stop coming from the carrying site, e.g., in the event of a power failure. Because the messages are periodic, the absence of status messages at the predictable interval alerts the other sites to the demise of the call carrier. The voter digital receivers respond to this situation in the same manner as they did when the echoed message informed them a new call carrier was needed.

BRIEF DESCRIPTION OF THE DRAWINGS

These and other features and advantages of the present invention will be better and more completely understood by studying the following detailed description of the presently preferred exemplary embodiments in conjunction with the FIGURES, of which.

DETAILED DESCRIPTION OF A PRESENTLY PREFERRED EXEMPLARY EMBODIMENT

Figure 1:
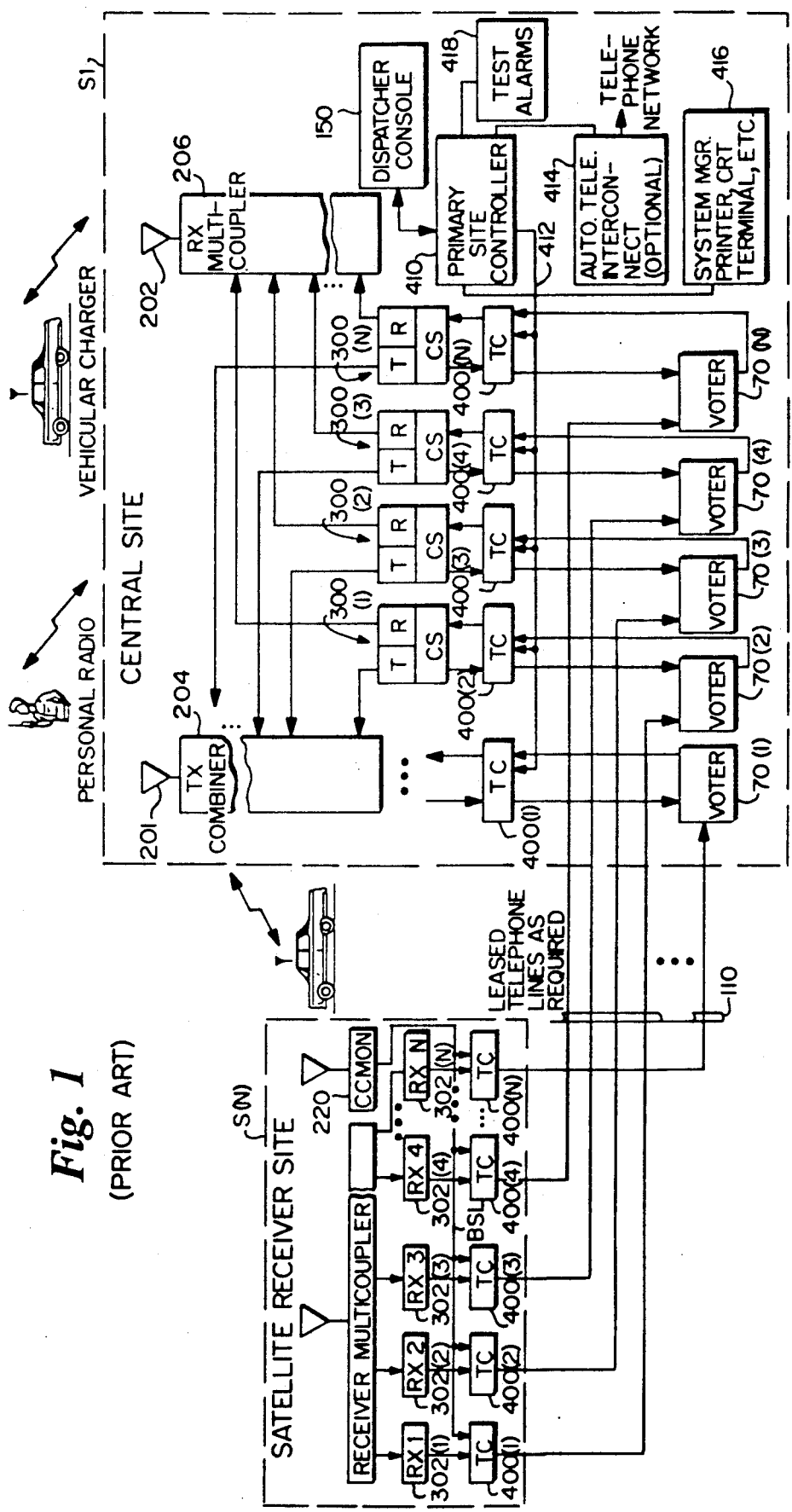
FIG. 1 is a schematic block diagram of a prior art PST RF trunking system to which the digital voter system of the preferred embodiment of the present invention is particularly applicable.

FIG. 1 is a schematic block diagram of a prior art digital RF trunking system in which the digital voter of the present invention may be used with particular advantage. The preferred exemplary embodiment digital RF trunking system shown in FIG. 1 is the General Electric Company 16 PLUS Digitally Trunked Public Service Radio System. Referring to FIG. 1, this system may include one or more transmitting sites S1, one or more satellite receiving sites S(2)-S(N), and a central dispatch console "station" (shown in FIG. 1 as part of main site S1 but typically located elsewhere).

The FIG. 1 system may be a so-called "simulcast" type system of the type described, for example, in application Ser. No. 07/260,184 of Rose et al, filed 20 Oct. 1988. Briefly, plural geographically distant transmitting sites S1 may be provided to cover a larger geographical coverage area, with these transmitting sites all being closely synchronized in time and frequency so as to "simulcast" (simultaneously broadcasted) transmissions. As will be appreciated, satellite receiving sites S(2)-S(N) (only one of which is shown in FIG. 1, but an arbitrary number of which may be provided) are spatially distributed throughout a coverage area such that radio reception of a particular RF transmission may be better at one or the other of the satellite receiving sites. Received signals from the satellite sites S2-SN as well as signals received by the transmitting site(s) S1 are combined by voter circuits 70 so as to select an acceptable signal for control or communication processing.

In such systems, voters 70 are located at a centralized location (e.g., the dispatch console) and communicate with the trunking cards 400 of each of the transmitting sites.

At the main site S1, a transmitting antenna 201 and a receiving antenna 202 (which may be a common antenna structure) may be utilized with conventional signal combining/de-combining circuits 204,206 as will be apparent to those in the art. Transmitting and receiving RF antenna circuitry 201-206 are connected to a plurality of duplex RF channel/receive circuits included in a plurality of RF repeater stations 300(1)-300(24). Typically, there may be as many as 24 such stations for 24 corresponding RF duplex channels (including a control channel). Each station transmitter and receiver circuitry is typically controlled by a dedicated control shelf CS (e.g., a microprocessor-based control circuit) as is also generally depicted in FIG. 1A. Such control shelf logic circuits associated with each station are, in turn, controlled by "trunking cards" TC (e.g., further microprocessor-based logic control circuits) 400(1)-400(24).

Trunking cards 400 communicate with one another and/or with a primary site controller 410 via control data bus 412. The primary site control may be a commercially available general purpose processor such as a DEC PDP-11/73 or the like. Although the major "intelligence" and control capabilities for the entire system resides in controller 410, alternate backup "failsoft" control functions are incorporated in the trunking cards 400 so as to provide continued trunked repeater service even in the event that controller 410 malfunctions or is otherwise taken out of service.

The voters 70 are connected so as to receive a plurality of input digital and/or analog signals and to selectively output therefrom an acceptable (e.g., the strongest and/or most reliable) one of the input signals. In the preferred embodiment, a voter 70 is provided for each RF channel operating on the trunking system. Thus, signals received on exemplary RF duplex channels 1-24 by transmitting site S1 are input to respective ones of voters 70(1)-70(24), while additional similar input signals are generated from satellite receiver sites S(2)-S(N) and by other transmitting sites if any (each of which also receive on exemplary channels 1-24) are also input to the appropriate respective voters 70(1)-70(24). The results of the voting process performed by voters 70 are then passed to respective main site trunking card circuits 400(1)-400(24) and/or T/R blocks 300 in the case of analog "clear voice" signals where they are further processed as valid "received" signals.

As mentioned above, one of the 24 duplex RF channels supported by the FIG. 1 system is assigned to be a control channel. Digital control information (e.g., channel assignments and the like) is transmitted by the main site S1 on the "outbound" frequency of this duplex control channel, and further digital control information (e.g., channel assignment requests) is transmitted on the inbound control channel frequency by mobile/portable transceivers. In the preferred embodiment FIG. 1 system, all mobile/portable transceivers monitor the outbound control channel signal stream transmitted by main site S1 when they are not actually engaged in ongoing communications on another channel (a "working channel"). Under the direction of control signals transmitted by main site S1 over the outbound control channel, certain individual or groups of mobile/portable transceivers may be directed to a working channel to communicate with other mobile/portable transceivers, the dispatcher and/or a landline caller. When the communications terminates on the working channel, the mobile/portable transceiver(s) return to monitoring the control channel.

In the FIG. 1 system, all communications across all channels are synchronized with the signal stream on the outbound control channel. The trunking card 400 assigned as the "main" transmitting site S1 control channel trunking card generates synchronizing signals defining 30 ms "frames", transmits these synchronizing signals over the outbound control channel frequency, and also applies these synchronizing signals to the other trunking cards 400 (as will be explained shortly). In a simulcast system, other transmitting sites are synchronized to the "main site" control channel slot timing as well. All mobile/portable transceivers synchronize with the outbound control channel sync signals while they are monitoring the outbound control channel. The mobile/portable transceivers then transmit messages on the inbound control channel frequency within inbound "slots" defined by the outbound control channel synchronizing signals. Each message is transmitted within a single "slot" and is always, in the preferred embodiment, transmitted beginning at or within a fixed time delay relative to a frame "edge" defined by the outbound control channel sync signals transmitted by the main site S1. An inbound slot does not have to exactly line up with outbound frame—there can be a fixed offset between the corresponding edges.

In the preferred embodiment RF trunking system, inbound control channel messages are thus "slotted" —meaning that they always begin at a fixed time relative to the occurrence of a 30 ms outbound frame edge. Since all mobile/portable transceivers synchronize to a common transmitter site S1 outbound control channel in the preferred embodiment, all mobile/portable transceivers operating in the trunking system will "agree" (within time uncertainties attributable to unequal RF propagation delays) on when this common frame edge occurs. Two RF transceivers that are keyed at nearly the same time will thus transmit either at virtually exactly the same instant (each waits until the occurrence of the next control channel frame edge to occur before transmitting) or separated by a 30 ms "slot" (so that the two transceivers transmit in different slots altogether).

In the event that two geographically proximate transceivers send in the same slot, the resulting RF signal collision will typically result in destroying both transmissions and thus prevent all receiving sites from correctly receiving either transmission. In this situation, neither transceiver will receive a responsive message from the transmitting site(s) S1 over the outbound control channel, and each will utilize a "random retry" technique to retransmit their respective messages while avoiding further RF collisions (see U.S. application Ser. No. 07/056,922 to Childress, referenced above).

If, however, the two transceivers transmitting within the same slot are geographically separated from one another, it is likely that a receiving site S(i) close to a first of the two transceivers will receive the transmission of that first transceiver while a further receiving site S(j) close to the other transceiver will receive the transmission of the other transceiver. Receiving sites S(i), S(j) will thus each report a valid message to voter 100 for that slot, and these two valid messages will arrive at voter 100 at about the same time. Voter 100 in the preferred embodiment uses an echoing/buffering technique to determine whether or not the messages are actually redundant. If the messages are redundant, only one message needs to be passed on and any other versions of the message may be discarded. If the messages are not redundant, the voter first selects one message and passes it on, and then selects another messages and passes it on—while eliminating redundant versions of each selected message.

In the FIG. 1 system, the control channel handles only digital messages, but the working channels are each capable of handling various types of signals including digital signals, analog "clear voice" signals, and digitized encrypted voice signals (Voice Guard). To increase flexibility, the FIG. 1 system can operate any of its exemplary 24 RF channels as a control channel (so that, for example, if the "control channel" hardware fails any working channel can become the control channel to replace the failed hardware). This means that each of voters 70 must be capable of processing both analog and digital signals, and that each of the voters must also be capable of performing any special processing of digital signals required for the control channel.

As described previously, one of the main functions of satellite receiving sites S2-SN is to receive and validate inbound messages and pass them along to digital voter 100 so duplicate messages can be discarded (another main function of the digital voter 100 is to route "voice" analog signals to the analog voter.) As mentioned above, one of the purposes of voter system 70 is to equalize talk-out and talk-in range of hand held (or other low power) transceivers. Typical base station transmitters have power outputs that exceed a hand held transceiver output by over 20 dB. If hand held and mobile transceivers are to have equal coverages (which is a requirement for most public service systems and for other systems as well), a number of geographically dispersed satellite receiving stations are needed. Some existing systems have over forty satellite receiving sites. Voter systems 70 provide the mechanism for selecting one acceptable version of redundant signals received by main site S1 and the various satellite sites S2-SN and for passing the selected signal to main site S1 for further processing.

It can be seen in FIG. 1 that the architectures of the satellite receiving sites S2-SN are very similar to that of the transmitting site(s) S1. Specifically, each satellite receiving site includes RF receivers 302(1)-302(N) (no transmitters are provided because the satellite receiving site has no transmit capability—unless it is a simulcast site) and associated trunking cards 400(1)-400(N). In the preferred embodiment, a control channel monitor 220 located at each received site S2-SN continuously listens to the outbound control channel transmissions of main site S1. This control channel monitor 220 receives and validates the slotted outbound control channel messages, strips off the dotting, Barker, and repeats, and sends the messages through a buffer onto a backup serial link (BSL) of the type described, for example, in copending application Ser. No. 07/056,046 cited above. The BSL thus synchronizes all trunking cards 400 located at the satellite site with the main site S1 outbound control channel. To preserve slot timing, the two 28-bit control channel messages typically found in an outbound control channel slot are concatenated and sent sequentially in the form of a single 11 byte (appended start, message type and parity bytes) message every 30 milliseconds (the filler nibble used to complete the fourth byte contains a bit indicating slot position).

One of the trunking cards 400 located in each satellite receiving sites S2-SN is designated as the control channel and uses the reception of the first byte on the BSL as a timing reference for inbound control channel messages (and thus can synchronously receive those inbound control channel messages with reduced falsing rate). The control channel monitor also provides operating mode status and—in working channel mode—call type information (i.e., clear voice, Voice Guard, etc.).

Figure 2:
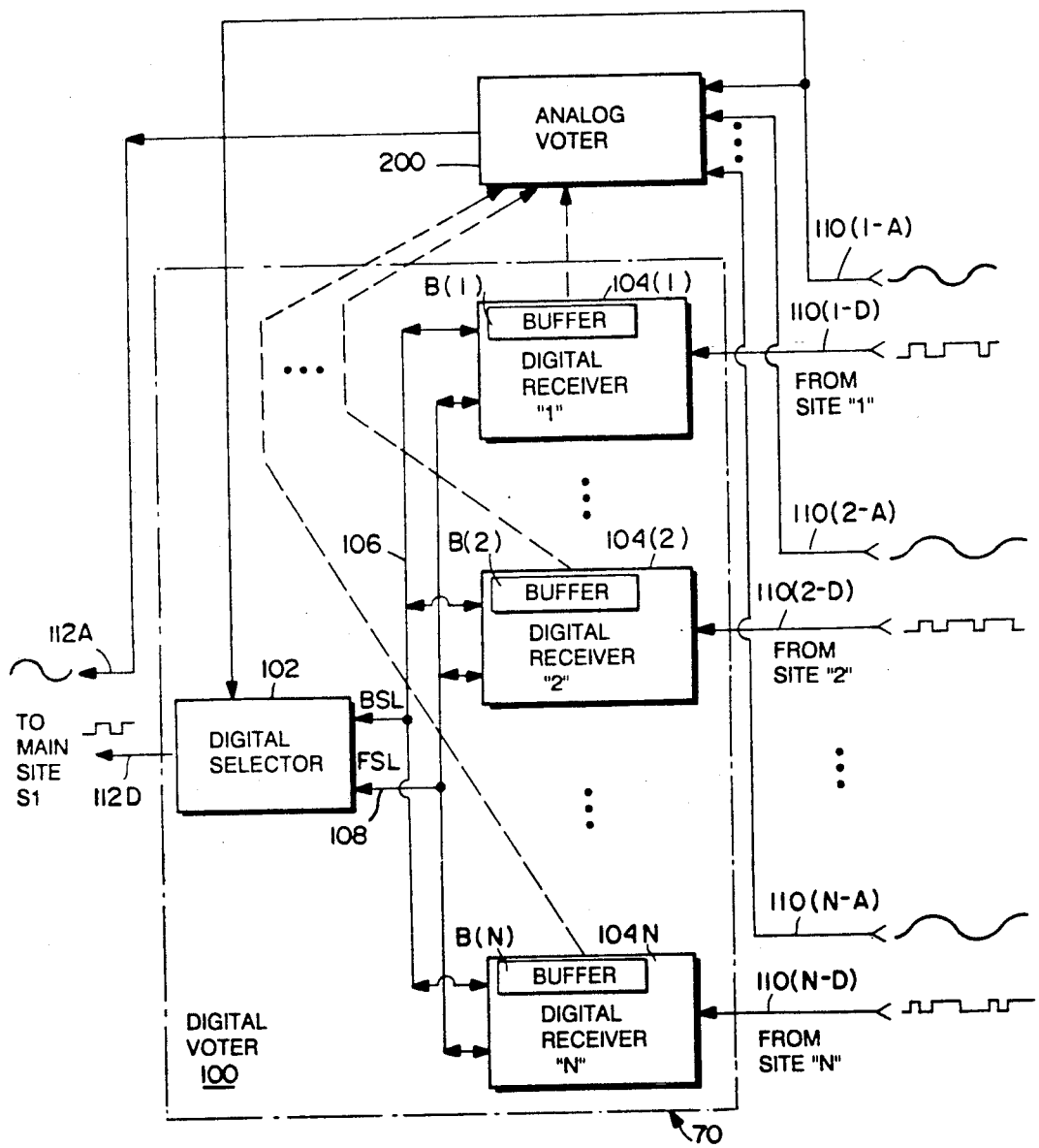
FIG. 2 is a schematic block diagram of the presently preferred exemplary embodiment digital voter system in accordance with the present invention.

FIG. 2 is a high level schematic block diagram of a presently preferred exemplary embodiment of a voter system 70 in accordance with the present invention. The voter system 70 shown in FIG. 2 provides voting functions for a single RF channel of the trunked radio repeater system (thus, there are typically multiple such FIG. 2 voter systems—one for each channel in the system).

Voter system 70 shown in FIG. 2 includes a digital voter 100 and an analog voter 200. The digital voter 100 votes on digital messages received from transmitting site(s) S1 and satellite sites S2-SN, discards redundant messages, and passes on only a single version of each digital message to main site S1 for further processing. Analog voter 200 votes on analog (clear voice) signals received by transmitting site(s) S1 and satellite sites S2-SN, selects the "best" (e.g., most reliable or highest quality) signal, and passes the selected signal to main site S1 for repeating over a working channel. During analog voting in the preferred embodiment, digital voter 100 also provides a call maintenance function by voting on digital status messages periodically generated by the sites S1-SN during clear voice reception.

Each voter 70 must be capable of processing both analog and digital signals in the preferred embodiment. Analog and digital signals are sometimes passed over the RF channels simultaneously but generally would not need to be voted on simultaneously. For example, during "clear voice" transmissions in the preferred embodiment, "subaudible" digital signals are transmitted over the same RF channel. However, these subaudible digital signals generally do not require routing by voters 70. Nevertheless, in the preferred embodiment simultaneous analog and digital voting capability is provided for reasons that will shortly become more apparent. Accordingly, in the preferred embodiment two signal communications links 110 are provided for each channel between each radio site and each voter—one for digital signals and one for analog signals. A telephone line (or microwave) communications link 110(1) comprising two "pairs" (or other "channels")—a channel 110(1A) for analog signals and another channel 110(1d) for digital signals)—may connect voter 70(1) to for example a given main site working channel A trunking card. A similar telephone line communications link 110(2A), 110(2D) may connect the satellite receiving sit S2 working channel A trunking card to voter 70(1), etc. Similarly, voter 70(2) processing signals for channel B will have a corresponding array of telephone line links 110 connecting it to the main site channel A trunking card and to each satellite site trunking cards for channel B.

As can be seen in FIG. 2, digital voter 100 includes digital selector 102, plural digital receivers 104(1)-104(N) corresponding to and associated with receiving sites S1-SN, a backup serial link 106, and a sync line (FSL) 108. The digital receivers 104 transmit data to selector 102 over the BSL 106 (and selector 102 in the preferred embodiment transmits data to the digital receivers over this link). The FSL 108 is used to help avoid collisions on the BSL 106 and for redundancy removal —as will be explained in much greater detail shortly.

Thus, backup serial link (BSL) 106 and the sync line (FSL) 108 are used for communicating information between digital selector 102 and digital receivers 104.

In the preferred embodiment, the BSL 106 includes two separate wires: the selector's transmit output is connected to all of the digital receivers' receive inputs, and the digital receivers' transmit outputs are all connected to the selector's receive input.

Figure 3:
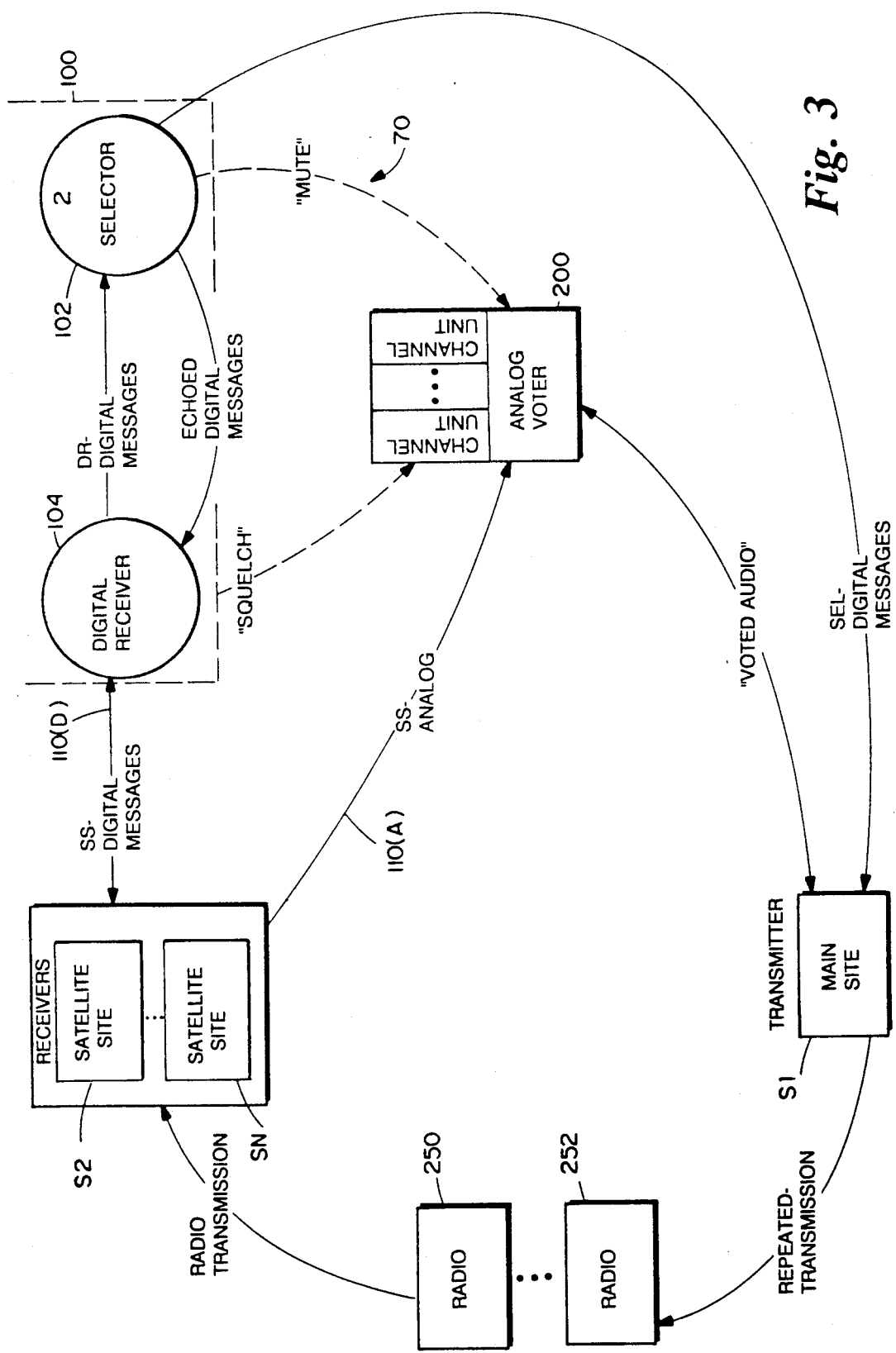
FIG. 3 is a schematic diagram of a state "context" diagram representative of the voting process performed in preferred embodiment shown in FIGS. 1 and 2.

FIG. 3 is a schematic block diagram of the "context" or environment in which voting is performed in accordance with the presently preferred exemplary embodiment of the present invention. The FIG. 3 diagram defines the environment for the exemplary voting process, including the external stimuli controlling the process. In FIG. 3 "bubbles" indicate processes. These processes are connected to one another by signal paths (and signal/data stores). Dotted lines indicate control data or signals. Boxes indicate terminators (terminators generate the external stimuli).

The FIG. 3 context diagram shows a single main transmitter site S1 as having a transmitter only. However, it will be understood that more than one transmitter site S1 may be used if desired. In addition, transmitter site S1 typically is equipped with receiving components and thus acts as a receiving station as well as a transmitting station. The receiving components that may be located at transmitter site S1 are coupled to the overall system just as are satellite receiving stations S2-SN—with the difference that in the preferred embodiment any control channel signals received by the main transmitting site S1 are not passed on to digital voter 100 but instead are acted upon locally in order to speed up the channel assignment process and decrease message duplication.

A transmitting radio receiver 250 in the preferred embodiment transmits RF signals over a radio transmission link (e.g., the inbound channel of a duplex RF channel pair) to receiving sites S2-SN. Such "radio transmissions" may include digital and analog or digital signals depending upon the type of call being generated. The preferred embodiment voter system 70 shown in FIG. 2 handles all of the call types currently handled by the GE PST system, including:

Clear Voice;
Special Calls; and
Voice Guard.

Briefly, the clear voice mode of communications involves the transmission of conventional analog FM voice-modulated RF signals preceded by digital signals used to establish a channel assignment and followed by certain digital signals used to terminate a channel assignment. In addition, subaudible digital signalling is transmitted with clear voice (the satellite receiving sites S2-SN receive this subaudible signalling, combine this information with transmitter status and site ID information, and generate periodic digital "status" messages in response to the subaudible signalling, and pass the "status" messages on to voters 70 over links 110—as will be explained). Thus, while the "radio transmission" signalling varies in general it includes high speed data handshaking, followed by (for "clear voice" type calls) analog voice combined with subaudible digital messaging. The transmission is terminated by transmitting more high speed digital signalling (e.g., a digital "unkey" message).

Satellite receiving sites S2-SN receive the "radio transmission" signalling from the transmitting radio transceiver 250, demodulate the RF signals to recover the modulated digital and analog signals impressed upon it, and then pass the digital and analog signals to voter 70. Voter 70 in the preferred embodiment includes an analog voter 200 and a digital voter 100. As described above, digital voter 100 operates in conjunction with the conventional analog voter 200.

With respect to the digital messages, satellite site control channel receivers/trunking cards are responsible for relaying received RF messages to digital voter 100. Channel assignment and site ID signals received by the satellite site control channel monitor 220 are also relayed to the channel trunking cards. When the expected signal is detected, the message and associated voice audio (digital or analog) is relayed to digital voter 100.

In the clear voice mode, each of the voice channel outputs is routed to the centrally located conventional analog voter 200, and this analog voter may continuously select the "best" received signal and route the "best" signal to the transmitting site(s) S1. The analog voter 200 "votes" on the analog signals inputted to it (this analog voting is performed on the basis of lowest noise, for example, in a conventional manner well known to those skilled in this art). In FIG. 3, the path labelled "SS-Analog" represents the path over which analog voice signals are communicated from receiving sites S2-SN to analog voter 200. These signals are either analog voice or 1950 Hz tone signals. When voice signals are to be voted upon, the 1950 Hz tone is turned off by the corresponding receiving site S2-SN so that the audio can be included in the analog voting process.

In the preferred embodiment, digital voter 100 has the task of controlling analog voter 200 outputs. In the preferred embodiment, all clear voice (analog) signals are preceded by digital signals, and digital receivers 104 within digital voter 100 are the components in the system which enable/disable (unsquelch/squelch) the outputs of analog voter 200. Analog voter 200 in the preferred embodiment includes a plurality of "channel units"—one for each satellite (main) site—and a selector module. Digital receiver 104(1) enables the output from its corresponding channel unit of analog voter 200 in the preferred embodiment, digital receiver 104(2) enables the output from its corresponding analog voter channel unit, etc. The input to the analog voter 200 is always present on the communication link, and digital receivers 104 squelch/unsquelch the output of their corresponding analog voter 200 channel units. Similarly, selector 102 is charged with the responsibility for muting/unmuting the output of analog voter 200 in order to prevent data from being repeated by the main site S1 as clear voice analog signals. Thus, during all types of calls, digital selector 102 must control the conventional analog voter 200 appropriately.

For example, if a digital receiver 104 fails to receive a KEY message it will never unsquelch the corresponding output to analog voter 200 and the analog voter will never have a chance to vote on the corresponding analog signals. The digital receiver 104 (and selector 102) control the squelching/muting of analog voter 200 under other circumstances as well—as will be explained in greater detail shortly.

In addition to the squelching control provided by the digital voter 100 in response to received digital messages, each satellite receiver site S2-SN in the preferred embodiment selectively generates a 1950 Hz tone which it inserts onto the telephone line communication links 110 connecting the satellite receiver sites to voter 70. Each of satellite sites S2-SN apply a 1950 Hz tone to its telephone line 110(A) whenever it is desired to cause the associated channel unit of the analog voter 200 to be squelched. The satellite site applies a 1950 Hz tone onto the telephone line 110 whenever the satellite site loses carrier or fails to detect low speed data during an ongoing call before an "unkey" or channel drop message is detected. Thus, in the preferred embodiment 1950 Hz tone is "on" if 1) the channel is down; or 2) the channel is up and a) no carrier is present, or b) high speed data is detected. The 1950 Hz tone causes the analog voter 200 corresponding channel unit to immediately squelch. The tone can be removed if carrier and low speed data are detected before the channel has been dropped—in which case the audio is patched through. The state of 1950 Hz tone signalling is also reported in the status message. However, a status message is not generated in response to a change in the state of 1950 Hz tone in the preferred embodiment.

Digital messages received from (and/or generated by) satellite receiver sites S2-SN are passed to associated digital receivers 104 via the FIG. 3 link labelled "SS Digital Messages." Such messages are generally received/derived from the received "radio transmission" messages—although in the preferred embodiment the satellite receiving sites S2-SN are capable of generating messages that are not directly in response to messages received over the RF link. For example, "alarm" messages can be generated by the satellite receiving sites upon detection of a hardware failure.

In addition, the satellite receiving sites S2-SN may generate status messages periodically (and thus not directly in response to receipt of RF messages). In the preferred embodiment, the main significance of status messages to digital voter 100 (other than whether or not they are being generated) is a flag within the status message indicating whether or not low speed (subaudible) data is being received by the receiving site generating the status message.

Additional messages passed over the "SS Digital Messages" link that have significance to the voter 100 are the KEY, UNKEY and DROP CHANNEL messages. These additional messages are generated by receiving sites S2-SN in response to similar "radio transmission" messages directly received by the receiving sites, or indirectly by deriving such messages from other messages received over the RF link.

Digital receivers 104 which receive digital messages from their corresponding receiver sites S2-SN attempt to communicate those messages to digital selector 102 in the form of "DR Digital Messages" (as shown in FIG. 3). These messages are messages received from the satellite receivers. The only digital receiver originated message is an alarm message. The digital receiver 104 attempts to pass every message it receives on to the selector 102—but the technique by which the digital receivers pass on such messages in the preferred embodiment results in redundant message removal. Briefly, if in the process of attempting to pass on a message one digital receiver 104 notices a duplicate message has already been passed on by another digital receiver within a specific time window, the one digital receiver "gives up" and discards its message.

This redundancy removal process in the preferred embodiment involves buffering within the digital receivers of the most recent "Echoed Digital Message" selected and repeated by digital selector 102 and discarding messages newly received from the receiving sites S2-SN if such newly received messages are the same as such buffered message within the time window. In the preferred embodiment, every message received by selector 102 from a digital receiver 104 is echoed back to all digital receivers. The digital receivers use these messages to look for duplication. The selector also "echoes" status messages received from the main site. The digital receivers use these main site status messages to determine whether they should operate in a working channel mode or in a control channel mode. Although this mode information is not required for proper operation, it is used for enhanced performance. The voter does light an LED to indicate its working mode.

In a trunked RF communications system, digital messages associated with clear voice, special call signalling, and status messages (which will be explained shortly) all contain error checking bits (CRC). These error checking bits make it possible for the components in the system to determine with a high probability if they have received a message without errors (and in some cases to actually correct error transmission). For non-Voice Guard messages, the preferred embodiment receiving sites S1-SN report to their corresponding voter digital receivers 104 only those received digital messages which do not contain bit errors. Therefore, digital voter 100 in the preferred embodiment does not (as least for non-Voice Guard transmissions) actually "vote" or otherwise decide which digital receiver 104 has the "best" message—since all digital receivers 104 receiving a message are already assured with high probability of having received a version of the message containing no bit errors (and it doesn't matter which of these received messages selector 102 selects). Rather, in the preferred embodiment digital voter 100 may operate on essentially a "first come first served" (FIFO) basis to relay only one copy of a particular valid message to the main site S1 via digital selector 102. The earlier filed Brown et al application Ser. No. 07/363,960 describes the details of how a protocol supported by BSL 106 and FSL 108 is used to eliminate contentions and remove redundant messages.

Briefly, in the preferred embodiment the FSL line 108 within digital voter 100 is used by digital receivers 104 as a "service request" line to determine whether BSL 106 is in use. Thus, FSL 108 is monitored by and can be controlled by each (every) one of digital receivers 104 as well as the selector 102. FSL 108 in the preferred embodiment of digital voter 100 may be thought of as the "first line of defense" for avoiding collisions on BSL 106 and for removing redundant messages.

Each digital receiver stores all messages echoed by digital selector 102 in a buffer (in the preferred embodiment, each digital receiver has its own buffer B which it independently maintains—as shown schematically in FIG. 2). When a digital receiver 104 has received a message to be passed to digital selector 102, it first checks the buffer containing the last (recent) messages echoed by the selector. If a message stored by this buffer is identical to the message the digital receiver has received from its associated satellite site, the digital receiver discards the message as being redundant. The echoed message remains in the "last message" buffer only for a short time (approximately 50 msec) and then the buffer is cleared. This prevents the discarding of a "new" message because the previous message happened to be identical.

If the message (at least initially) does not appear to be redundant, the digital receiver 104 checks the state of FSL 108. Only a digital receiver 104 which seizes control of the FSL is permitted to transmit data on the BSL 106—and no digital receiver can seize the FSL unless it first tests the state of the FSL and finds it to be inactive. If FSL 108 is active (indicating the BSL is in use) when the digital receiver 104 tests its state, the digital receiver 104 enters a mode in which it continually checks its message buffer B and also continually checks the state of FSL 108—while meanwhile continuing to store within the message buffer B any messages echoed by digital selector 102. This process continues until either the FSL is released and can be seized by the digital receiver 104 (in which case the digital receiver will attempt to transmit its message over BSL 106) or until the digital receiver has stored an echoed message in its message buffer B that is identical to the message (if this happens the digital receiver "dumps" its message by discarding it). In the preferred embodiment, the digital receiver 104 clears its message buffer B occasionally (e.g., 25 to 50 ms after it received the message from its associated receiving site) to prevent the digital receiver from erroneously discarding a "new" message because it is identical to an outdated message.

In the preferred embodiment, the digital selector echoes a message byte for byte as it is receiving the message. When the digital selector 102 echoes a message it transmits an extra "null" byte to give the digital receivers 104 time to compare the newly echoed message with any messages they have to send. The FSL line 108 is held low (active) for the duration of the transmitted messages in the preferred embodiment.

When a digital receiver 104 finally has the opportunity to gain control of FSL 108, it seizes the FSL by changing the state of the FSL line (e.g., by "pulling down" the level of the line to an active logic low level). Changing the state of the FSL 108 allows all other digital receivers 104 (and digital selector 102) to know that the BSL 106 is in use. The seizing digital receiver 104 keeps the FSL in the active low state for the duration of the message it transmits, and the selector 102 also seizes the FSL and keep it in the active state for the duration of the echoed version of the message.

In the preferred embodiment, even though two digital receivers 104 could obtain access to BSL 106 at approximately the same time, they do not begin transmitting data on the BSL at the same time. To eliminate data collisions on BSL 106 in the event that more than one digital receiver 104 has seized FSL 108 simultaneously, each digital receiver 104 in the preferred embodiment does not transmit its message immediately upon seizing FSL 108, but instead each waits a predetermined unique time period (i.e., the waiting period for each digital receivers is different) after it seizes the FSL before transmitting its message over BSL 106 to digital selector 102. During this waiting period, the digital receiver 104 closely monitors the BSL 106 for signals. If a digital receiver 104 detects a signal on BSL 106 during its waiting period, it aborts its attempt to transmit on the BSL and begins the procedure of waiting for the FSL to be inactive again.

Redundancy removal relates to the effectiveness of digital voter 100 at discriminating between redundant and non-redundant messages. When a mobile or portable radio transceiver transmits a message, some or all of sites S(1)-S(N) may receive a version of the message. Redundant messages in the preferred embodiment are thus all substantially simultaneously received versions of the same message (i.e., and all from the same source mobile or portable transceiver). Because each digital receiver maintains a message buffer containing the message most recently echoed by the digital selector 102 and never attempts to send (but instead discards) messages identical to that stored in the message buffer, actual redundancy checking and redundant message removal is accomplished efficiently in a distributed manner at each of the digital receivers 104. For redundancy removal, the digital selector 102 needs only to accept every message it receives and to echo each received message. The redundancy removal is thus performed by the digital receivers 104 in the preferred embodiment—in part by discarding messages that are identical to the most recently echoed message and in part via the FSL/BSL protocol arrangement of the digital voter 70 (which ensures no contentions occur while also providing redundant message removal by forcing digital receivers 104 having messages to wait—during which waiting period they can compare their messages with the last message received and then echoed by the selector).

Referring once again specifically to FIG. 3, the messages received by the selector 102 are passed on to the "main" transmitting site S1 in the form of "SEL Digital Messages". In the preferred embodiment selector 102 does not discard any message. Every message the selector 102 receives is passed on to the transmitting site S1. The only selector-originated message in the preferred embodiment is an alarm message which indicates to the main transmitting site S1 that the digital voter 70 of some component thereof has failed.

The transmitting site S1 thus receives the "SEL Digital Messages" from the selector, and also receives the "voted audio" signals from the output of the analog voter 200. The transmitting site S1 generates high-speed digital messages and repeats voted analog audio over the "outbound" RF channel in response to these (and other) input signals. The actual signalling varies depending upon the type of call, but in general a call is composed of high speed digital handshaking followed by analog voice signals combined with subaudible digital signalling. The transmission is typically terminated by switching to high speed digital signalling and transmitting an "unkey" message.

Figure 4:
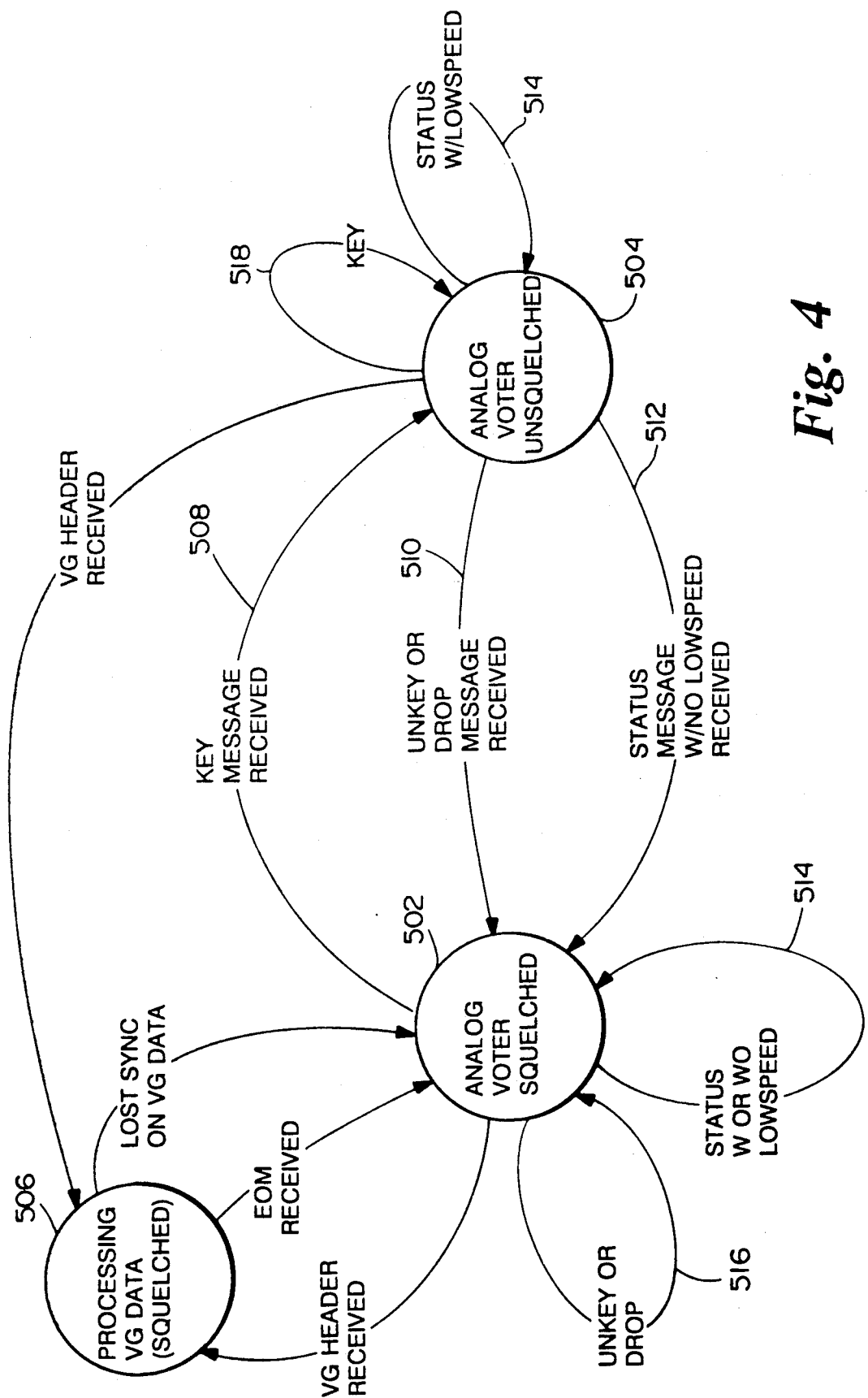
FIGS. 4 and 5 are schematic state diagrams of exemplary state transitions in response to input signals performed by the digital receivers and the digital selector shown in FIG. 2.

FIG. 4 is an exemplary state transition diagram describing the operation of a digital receiver 104. Digital receiver 104 in the preferred embodiment is capable of operating in three different states: "Analog Voter Squelched" ("bubble" 502); "Analog Voter Unsquelched" (bubble 504); and "Processing VG Data" (bubble 506). In each of these three states, the digital receiver 104 generally attempts to pass on to selector 102 (and eventually to transmitting site S1) each and every digital message it receives from its associated received site.

In the "Analog Voter Squelched" state 502, the digital receiver 104 squelches the analog voter 200 analog output which comes from the particular receiving site S2-SN with which the digital receiver is associated and waits to receive messages from the receiving site over link 110(D).

If the digital receiver 104 receives a KEY message indicating a new call has been received (state transition path 508) it enters the "Analog Voter Unsquelched" state 504 and unsquelches the corresponding analog voter 200 output in preparation for clear voice analog signal voting. Once in this "Analog Voter Unsquelched" state 504, receipt of an UNKEY or DROP CHANNEL message (or a status message indicating no low speed data) causes the digital receiver 104 to return to the "Analog Voter Squelched" state 502 and squelch the corresponding analog voter output (path 510). If a Voice Guard header is received by the digital receiver 104 when it is operating in the "Analog Voter Unsquelched" state 504, the digital receiver transitions to begin operating in the "Processing VG Data" state 506 (the analog voter output is squelched in this state). This VG state 506 is entered whenever a Voice Guard header is received in the preferred embodiment, and is exited upon loss of Voice Guard synchronization or upon indication that the end of the VG message (EOM) has occurred. Specifics relating to the operation of the digital receiver in this "Processing VG Data" state 506 may be found in copending application Ser. No. 07/420,244 of Derenge et al cited above.

In the preferred embodiment, receiving sites S1-SN periodically send "status" digital messages to digital voter 100. These status messages are generated, for example, every 250 ms by each satellite receiving site S2-SN when there are no other messages to send. While one of the purposes of these status messages is to constantly verify integrity of the communications link 110(D), another important purpose of the status messages is to permit digital voter 100 to confirm that remote receiver sites are still active and operating and that at least one site continues to receive an ongoing clear voice call.

The exemplary format for status messages used (when transmitted over phone lines) in the preferred embodiment is as follows:

| S1 | S2 | MT | B1 | B2 | B3 | B4 | B5 |

| | | |
|---|---|---|
| S1 | Barker 1 | 57H |
| S2 | Barker | 12H |
| MT | message type | (STATUS) |
| B1-B4 | message bytes | |
| B5 | inverted XOR parity | |

The "Message Bytes" fields contain a variety of information, including for example information received by the satellite receiving sites S2-SN from the transmitting site S1 in the form of "Site ID" messages. However, at least one bit within the "Status" message format constitutes a "Low Speed Data Present" flag. As mentioned above, during clear voice transmissions each transmitting transceiver transmits low speed (subaudible) signalling in addition to the clear voice analog signals. The satellite receiving sites S2-SN continually monitor for the presence of such low speed data and modify the status message accordingly by setting or clearing the "Low Speed Data Present" flag within the Status message. If during a clear voice transmission a satellite receiver fails to detect low speed data, it reflects that information in a Status message with a "Low Speed Data" flag indicating that low speed data is NOT present. In the preferred embodiment, digital receivers 104 test the Low Speed Data Present flag and perform functions in response to the state of this flag.

For example, if the digital receiver 104 is operating in the "Analog Voter Unsquelched" state 504 and receives a Status message indicating that no low speed data is being received, a state transition (path 512) to the "Analog Voter Squelched" state 502 occurs—thus "disqualifying" the analog signals being generated by the corresponding satellite receiving site S2-SN from being voted upon by the analog voter 200. On the other hand, receipt of a status message having a low speed data flag indicating that low speed data is being received by the satellite receiving site causes the digital receiver to attempt to transmit the status message to digital selector 102 but permits the digital receiver 104 to continue to operate in the "Analog Voter Unsquelched" state (path 514).

Receipt of a status message by a digital receiver 104 operating in the "Analog Voter Squelched" state 502 does not cause the digital receiver to change state in the preferred embodiment —regardless of whether or not the status message indicates low speed data is present (path 514). Similarly, receipt of an UNKEY or DROP CHANNEL message while operating in the "Analog Voter Squelched" state 502, or receipt of a KEY message while operating in the "Analog Voter UN-Squelched" state does not cause a state transition (paths 516, 518, respectively)—although the digital receiver 104 will attempt to transmit such received messages to digital selector 102.

Figure 5:
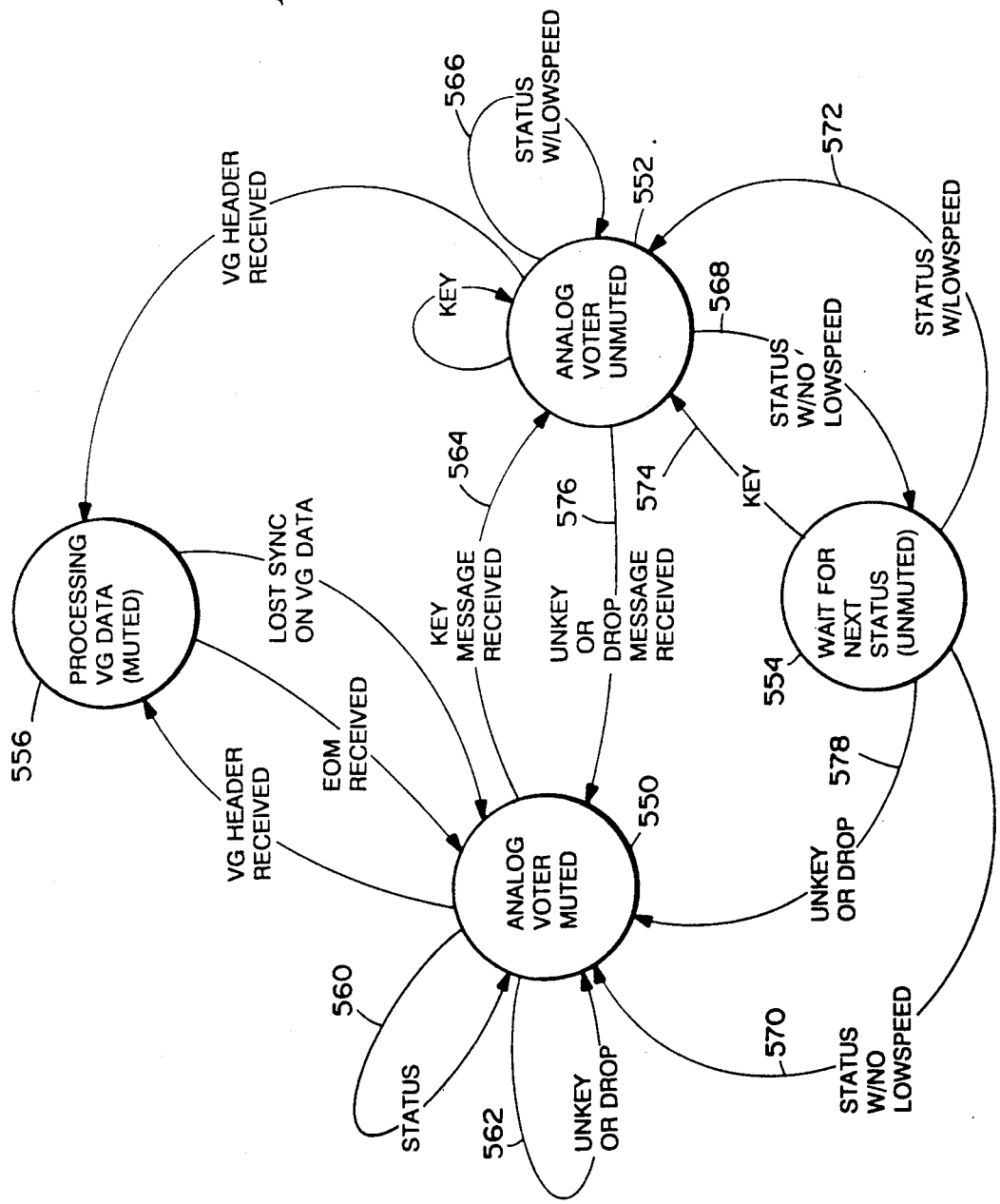

FIG. 5 is a graphical illustration of an exemplary state transition diagram describing the operation of digital selector 102 in the preferred embodiment. In the preferred embodiment the digital selector 102 has four different states: "Analog Voter Muted" state 550; "Analog Voter Unmuted" state 552; "Wait For Next Status" state 554; and "Processing VG Data" 556.

During operation in the "Analog Voter Muted" state 550, the digital selector 102 mutes the output of analog voter 200 (so that no analog signals are passed on to transmitting site S1). Receipt of UNKEY, DROP CHANNEL or STATUS messages when in this state does not cause the digital selector 102 to change states but the selector does pass such selected message on to the transmitting site S1 (paths 560, 562). Receipt of a KEY message (indicating a new call has begun) causes the selector 102 to enter the "Analog Voter Unmuted" state 552 (path 564) and unmute the output of the analog voter 200.

Periodic receipt by the selector 102 of status messages indicating the presence of low speed data keeps the selector operating in the "Analog Voter Unmuted" state 552 (path 566). If the selector 102 receives a status message indicating that low speed data is not present (e.g., generated by a digital receiver that had been but no longer is receiving low speed data), the selector enters the "wait for next status" state 554 (path 568). Receipt of another status message (from the same or different digital receiver in the preferred embodiment) indicating the absence of low speed data causes selector 102 to return to the "Analog Voter Muted" state 550 and to mute the analog voter 200 output (thus effectively terminating the clear voice voting) (path 570). In the preferred embodiment, the main site actually makes the decision to terminate the call. On the other hand, if selector 102 while operating in the "Wait for Next Status" state 554 receives a status message from any digital receiver indicating the presence of low speed data, it returns to the "analog voter unmuted" state 552 (path 572).

The net effect of state transition paths 568-572 described above is that the selector will mute the analog voter 200 output if it receives two status messages in a row indicating the lack of low speed data. However, because the digital voter 100 automatically operates to remove redundant messages, receipt by the selector 102 in the preferred embodiment of two such "no low speed data" status messages in a row indicates not merely that one satellite receiving site S2-SN has ceased receiving the clear voice call—but rather that ALL satellite receiving sites have ceased receiving the call and that no satellite receiving site is currently receiving low speed data (if this is not the case, then some other satellite receiver site will supply a status message indicating low speed data is present and that message—being different from the message indicating no low speed data—will not be discarded but will instead be selected by the selector).

It can thus be seen that while the principal function of digital voter 100 is to receive messages from receiving sites S1-SN, select only (any) one version of redundant digital receiver outputs, and relay the selected output to transmitting site(s) S1 —during clear voice transmission this voting function (in conjunction with status messages) is used in the preferred embodiment to ensure that at least one site S1-SN is actually receiving the incoming call—thereby providing efficient call trunking and termination without requiring additional system complexity or overhead.

FIG. 5 also shows that a KEY message received by selector 102 during the time it is operating in the "Wait For Next Status" state 554 will cause the selector to return to the "Analog Voter Unmuted" state 552 (path 574). This path may permit a call to continue under some circumstances based on keying of the same or different RF transceiver even after the call is "officially" terminated. Receipt of an UNKEY or DROP CHANNEL message causes the voter to return to the "Analog Voter Muted" state from either of states 552, 554 (paths 576, 578).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a digitally trunked radio frequency communication system of the type including at least one transmitting site, multiple receiving sites for receiving RF call signals associated with a call involving at least one mobile or portable radio transceiver, and a voting apparatus coupled to said transmitting site and to each of said multiple receiving sites, said multiple receiving sites providing received call signals associated with said call to said voting apparatus, a method of operating said system including the following steps:
   processing said call signals provided by said multiple receiving sites for retransmission by said transmitting site;
   generating digital status messages at said multiple receiving sites indicating whether RF signals associated with an ongoing call continue to be received from said mobile or portable radio transceiver;
   substantially concurrently with providing received call signals to said voting apparatus, providing said digital status messages from each of said multiple receiving sites to said voting apparatus; and
   terminating processing of said call signals at said voting apparatus if said digital status messages indicate that none of said multiple receiving sites continue to receive signals associated with said call.

2. A system as in claim 1 wherein said digital status message generating step includes the step of periodically generating said digital status messages.

3. A system as in claim 1 further including the steps of:
   (i) communicating received signals between a first of said multiple receiving sites and said voting apparatus over a first signal pathway; and
   (ii) simultaneously with said first communicating step (i), communicating digital status messages between said first receiving site and said voting apparatus over a second signal pathway which is isolated from said first signal pathway.

4. A system as in claim 1 wherein said digital status messages each comprise a sequence of multiple digital bit values.

5. In a digitally trunked radio frequency communication system of the type including plural receiving sites for receiving transmitted RF signals, and a voting apparatus coupled to said plural receiving sites, said plural receiving sites for receiving an RF transmission and providing responsive received signals to said voting apparatus, said voting apparatus processing said responsive received signals, a method of operating said system comprising the following steps:
   receiving an RF transmission with said plural receiving sites and providing responsive received signals to said voting apparatus;
   generating digital status messages at said plural receiving sites and communicating said status messages to said voting apparatus, said status messages indicating continued reception of said RF transmission;

applying, at said voting apparatus, a redundant message removal process to status messages provided by said plural receiving sites so as to determine whether any of said plural receiving sites is receiving said transmission; and terminating processing of said responsive received signals at said voting apparatus if said redundant message removal process fails to yield at least one status message indicating said transmission continues to be received.

6. In a trunked digital radio communications system of the type including plural geographically separated digital radio frequency (RF) transceivers each for receiving digital radio frequency signals transmitted over a common radio frequency channel, an improved digital voting system comprising:

a first digital receiver means for receiving a first digital message responsive to an RF message transmitted over said RF channel;

a second digital receiver means for receiving a second digital message responsive to an RF message transmitted over said RF channel;

message selecting means coupled to said first and second digital receiver means for selecting said first digital message or said second digital message and for echoing the selected digital message to both of said first and second digital receiver means; and comparison means operatively coupled to said first digital receiver means and connected to receive said echoed selected message, for inhibiting said message selecting means from selecting said first digital message if said first digital message is substantially identical to said echoed selected message.

7. In a trunked digital radio communications system of the type including:

a first radio frequency (RF) receiver disposed at a first geographical location, said first RF receiver receiving RF signals and forwarding responsive signals to a voter; and a second RF receiver disposed at a second geographical location different from said first location, said second RF receiver receiving RF signals and forwarding responsive signals to said voter, said voter being connected to receive said responsive signals forwarded by each of said first and second RF receivers, said voter selecting from signals forwarded thereto and discarding redundant versions of said signals, an improved method of operating said system comprising:

(a) in response to receipt of said RF signals by said first RF receiver, continually generating, with a first signal processor coupled to said first RF receiver, status messages indicating that said first RF receiver is receiving said RF signals;

(b) in response to receipt of said RF signals by said second RF receiver, continually generating, with a second signal processor coupled to said second RF receiver, further status messages indicating that said second RF receiver is receiving said RF signals; and (c) inhibiting, with said voter, selection of any of said responsive signals if said first and further status messages indicate said first and second RF receivers have both ceased receiving said RF signals.

8. A method as in claim 7 wherein said said generating steps (a) and (b) are performed periodically by said first and second signal processors.

9. A trunked digital radio communications system having an improved voter call maintenance arrangement, said system including:

a first radio frequency (RF) receiver disposed at a first geographical location, said first RF receiver receiving RF signals and communicating signals responsive to said RF signals received thereby to a voter;

first status message generating means operatively coupled to said first RF receiver for continually generating digital status messages indicating whether said first RF receiver is receiving said F signals;

a second RF receiver disposed at a second geographical location different from said first location, said second RF receiver receiving RF signals and communicating signals responsive to said RF signals received thereby to said voter;

second status message generating means operatively coupled to said second RF receiver for continually generating status messages indicating whether said second RF receiver is receiving said RF signals, said voter being connected to receive said responsive signals communicated thereto by said first and second RF receivers and also connected to receive said status messages, said voter selecting from signals communicated thereto and providing said selected signals to an output thereof, said voter inhibiting said selection and/or ceasing to provide said communicated signals if said status messages indicate said first and second RF receivers have each ceased receiving said RF signals.

10. A system as in claim 9 wherein said first and second status generating means periodically generate said status messages.

11. In a digitally trunked RF communications system of the type including first and second RF receivers each for providing received versions of RF signal messages, an improved voting apparatus including:

message selecting means operatively coupled to said first and second RF receivers, said message selecting means for selecting between a received version of a message provided by said first RF receiver and a received version of a message provided by said second RF receiver and for echoing said selected messages;

a buffer coupled to said message selecting means for temporarily storing echoed messages; and comparison means, operatively coupled to said buffer and connected to receive messages provided by said first RF receiver, for discarding messages provided by said first RF receiver that are redundant with echoed messages stored in said buffer.

12. A trunked digital radio communications system having an improved voter, said system including:

an RF transmitting station;

a voter coupled to said RF transmitting station for selecting one of plural signals and providing said selected signal to said RF transmitting site for retransmission over an RF channel;

a radio frequency (RF) satellite receiver site geographically distant from said RF transmitting site, said RF satellite receiver site receiving RF signals and communicating a signal responsive to said RF signals received thereby to said voter over a first signal path coupling said RF satellite receiver site to said voter, said voter being capable of selecting said communicated signal as one of said plural signals; and status message generating means disposed at said RF satellite receiver site for generating digital status messages indicating if said RF satellite receiver site is receiving said RF signals and for providing said digital status messages to said voter over a further signal path isolated from said first signal path at least during the time said RF satellite receiver site is receiving said RF signals, wherein said voter is capable of selectively terminating voting on said plural signals in response to said digital status messages.

* * * * *